Aug. 8, 1950     I. F. REED ET AL     2,517,597
PEANUT DIGGING MACHINE Filed Oct. 2, 1945                                             7 Sheets-Sheet 1

Fig. 1.

Inventors
I. F. REED
O. A. BROWN

H. N. Foss
W. Bier
Attorneys

Aug. 8, 1950     I. F. REED ET AL     2,517,597
PEANUT DIGGING MACHINE Filed Oct. 2, 1945     7 Sheets-Sheet 3

Inventors
I. F. REED
O. A. BROWN

By H. A. Foss
W. Bier
Attorneys

Aug. 8, 1950     I. F. REED ET AL     2,517,597
PEANUT DIGGING MACHINE
Filed Oct. 2, 1945     7 Sheets-Sheet 6

Inventors
I. F. REED
O. A. BROWN

H. N. Foss
W. Bier
Attorneys

Patented Aug. 8, 1950

2,517,597

UNITED STATES PATENT OFFICE 2,517,597

PEANUT-DIGGING MACHINE

Irvin F. Reed, Auburn, Ala., and Oral A. Brown, Ellisville, Miss., assignors to United States of America as represented by the Secretary of Agriculture Application October 2, 1945, Serial No. 619,914

3 Claims. (Cl. 55—9)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to peanut-digging machines and has, among its objects, the provision of a machine which is easy to construct, simple to operate, and inexpensive to manufacture, and which, in operation, will rake peanut vines from the soil, shake them free of dirt, and cast them aside. Other objects will be apparent from the following description of the invention.

In general, the invention provides a peanut-digging machine which has a frame, downwardly extending teeth and attachments to engage the soil, and means for moving the teeth in a plane having a vertical component, preferably inclined to the direction of movement of the machine when the latter is in motion, whereby the teeth engage the soil, drag the peanut vines therefrom, and shake them substantially free from dirt. A digger may be provided forward of the rake to loosen the soil around the vines.

Referring with more particularity to the embodiment shown in Figures 1 to 5 inclusive, the peanut-digging machine has a main frame 11 which is supported near its forward end by axle 12, said axle being rotatable, being provided with drive wheels 13 which are coupled to the axle at its ends by conventional differentials 14, and being attached to the main frame 11 by means of right bearing housing 15 and left bearing housing 16. A caster wheel 17, conventionally attached to the main frame at its rearward end, supports said frame at its rearward end.

A tongue 18, the means to which a drawing power is attached to the machine, has an opening therein which passes laterally through it near its rearward end. The tongue is pivotally connected to the main frame 11 by means of a bar 19, shown in Figure 2, which passes through said opening and is secured at each of its ends to plates 20, one of such plates also being shown in Figure 2. These plates protrude downwardly from the forward ends of the sides of main frame 11 and contain a series of spaced openings therein to permit the tongue to be raised or lowered, as desired. Tongue 18 is further supported by braces 21, each of which is rigidly attached at one end to the tongue and pivotally attached at its other end to bar 19. A conventional hitch 22 is provided at the forward end of the tongue for connection to a drawing power such as a team of horses or a tractor.

A rake, for raking and shaking the peanut vines, has a rake frame 25 in the substantial form of a square, or a rectangle. This rake frame is pivotally mounted on main frame 11. More specifically, its left side 26 is directly pivotally mounted on the main frame by means of pivot pin 27, while the opposite right side 28 is indirectly connected to the main frame through the medium of bracket 29, which bracket is substantially rectangular in shape, lies parallel to and below axle 12, and is rigidly attached at one of its corners to bearing housing 15, and thus to the main frame. At its opposite corner, bracket 29 is rigidly secured to the lower extension 30 of clutchplate 31 (said clutchplate to be later described more fully) by means of bolts 32 or other conventional attaching means. Side 28 is directly mounted between ears 33 and 34 of a U-shaped member, the lower closed end of which is securely attached to bracket 29, and is pivoted between said ears by pivot pin 35 lying in alignment with pivot pin 27, sufficient space being provided between the ears and below that portion of pivot pin 35 passing between the ears to permit side 28 to oscillate freely. As will be noted, the pivotal attachments are provided near the forward end of the rake frame. Therefore, as the rake frame is pivoted on its attachments, the rearward side is raised or lowered.

Figure 4:
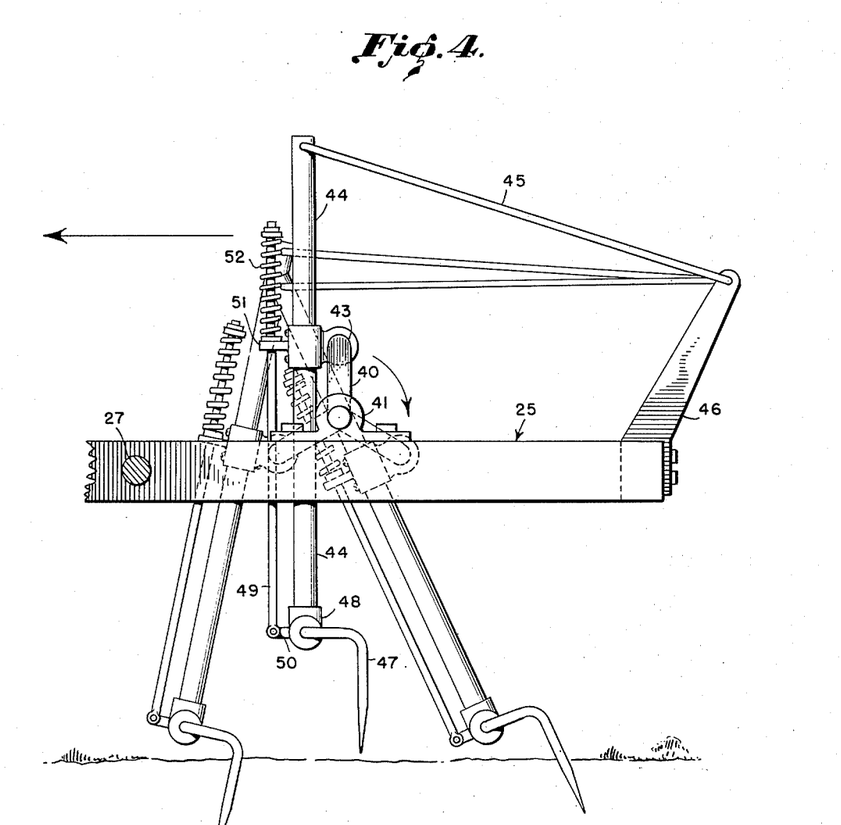
Figure 4 is a detail elevation of the rake.
Figure 5:
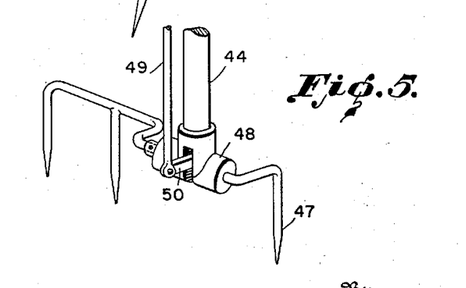
Figure 5 is a fragmentary three-dimensional view of an individual set of rake teeth and its immediate attachments.
Figure 6:
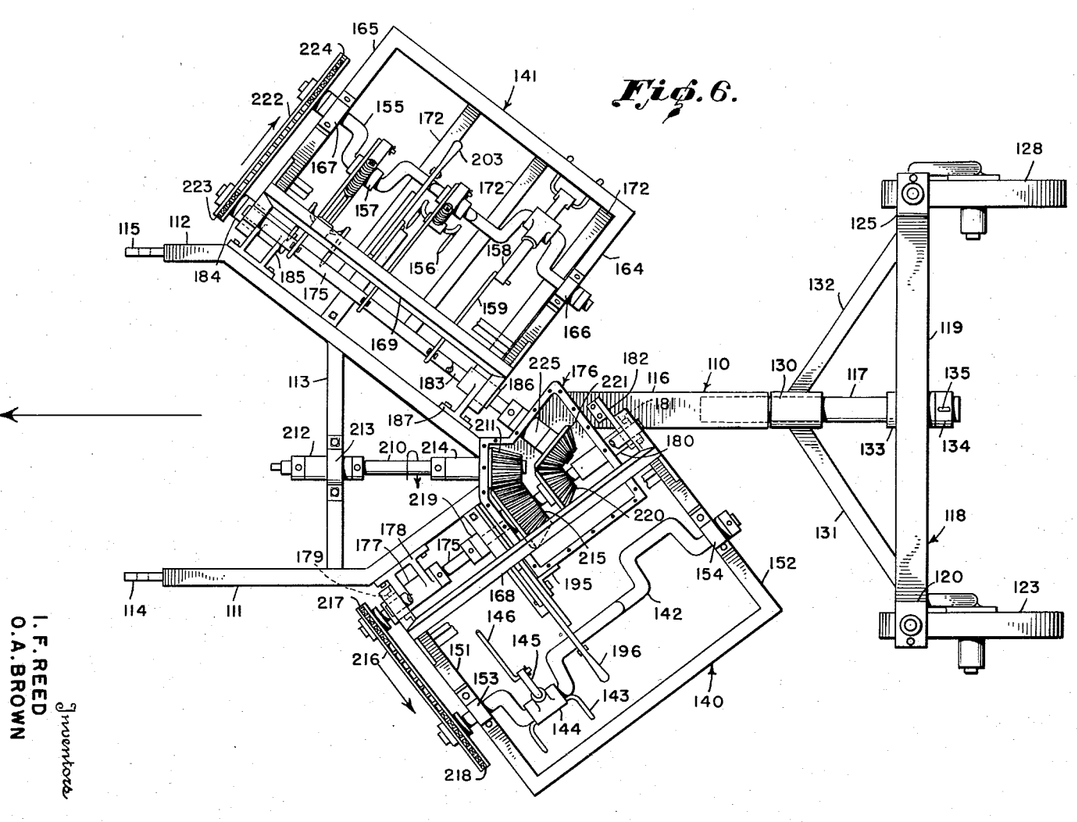
Figure 6 is a top plan view of a second embodiment of the invention illustrating a machine having two rakes (certain parts of one rake being omitted for the purpose of emphasizing other parts) and adapted for raking up two rows of peanut vines simultaneously, said rakes being driven from the power take-off of a tractor (not shown)
Figure 7:
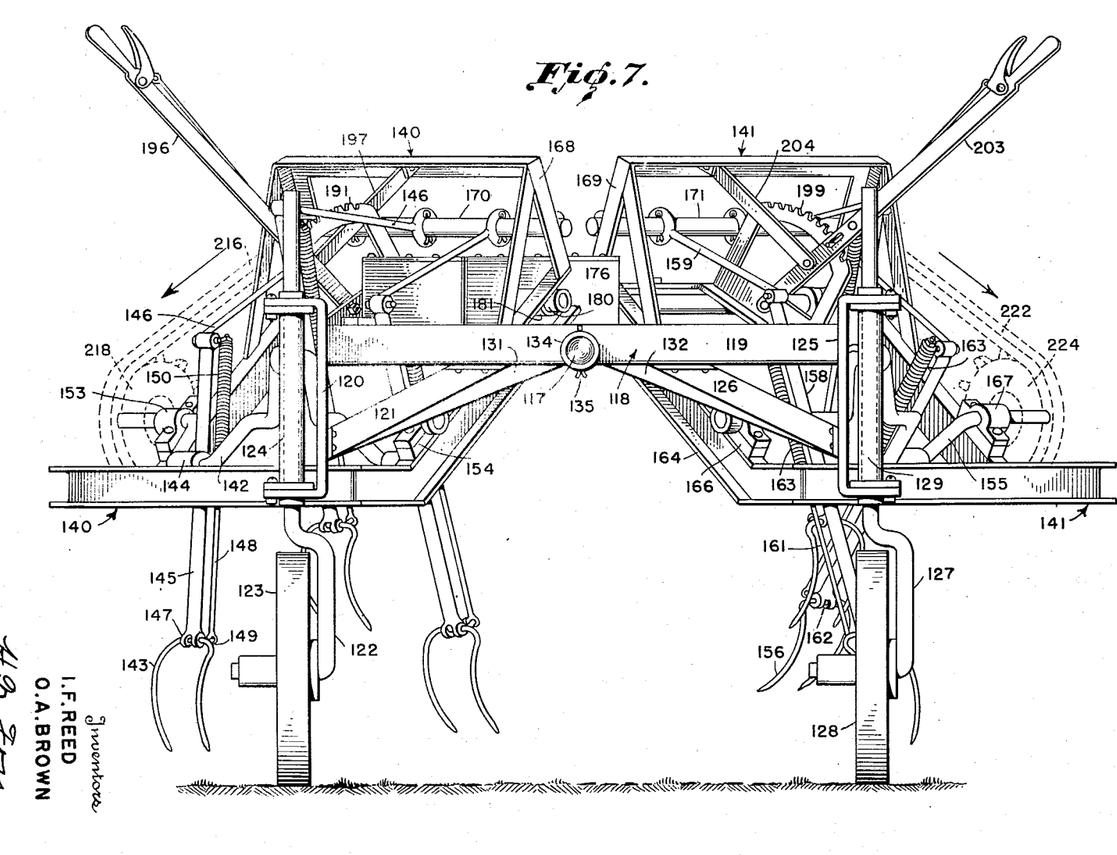
Figure 7 is a rear elevation of the second embodiment.
Figure 8:
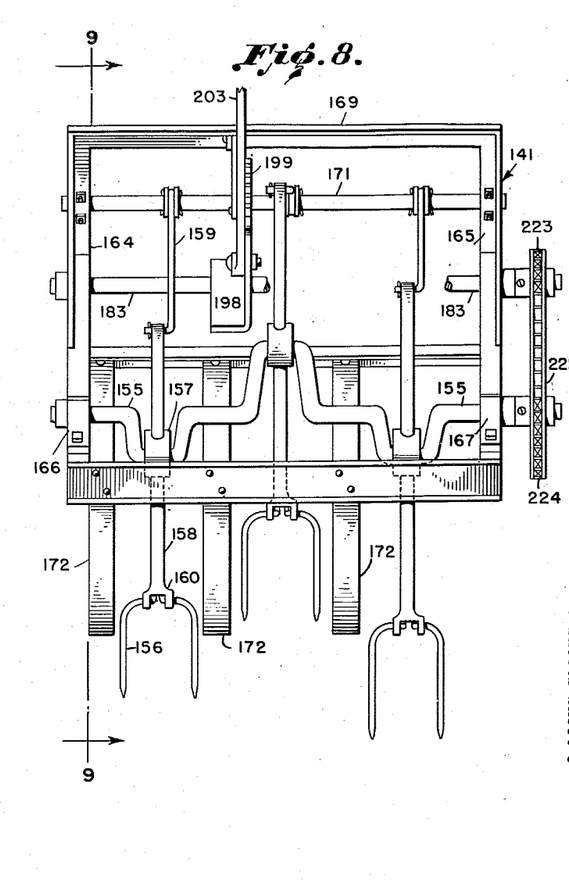
Figure 8 is a detail, two-dimensional view of the rake located on the right side of the machine (certain parts being omitted for the sake of emphasizing other parts)

Rake frame 25 is provided with a rotatable crank shaft 40 having a plurality of offset cranks, the ends of the crank shaft being mounted on side 26 and side 28, respectively, through shaft bearings 41 and 42. The crank shaft is rotatably attached through a rake-rod bearing 43 to a rake rod 44, the upper end of said rake rod, as best shown in Figure 4, being pivotally attached to one end of a rake bar 45. The rake bar, at its other end, is pivotally attached to one end of a rake-bar support 46, which, in turn, is rigidly attached at its other end to the rearward side of rake frame 25. This construction constrains the upper end of the rake rod to oscillate in an upward-and-downward direction relative to the machine during rotation of the crank shaft, while, at the same time, a rotatory motion in a plane having a vertical component is imparted to the lower end of the rake rod.

Figure 1:
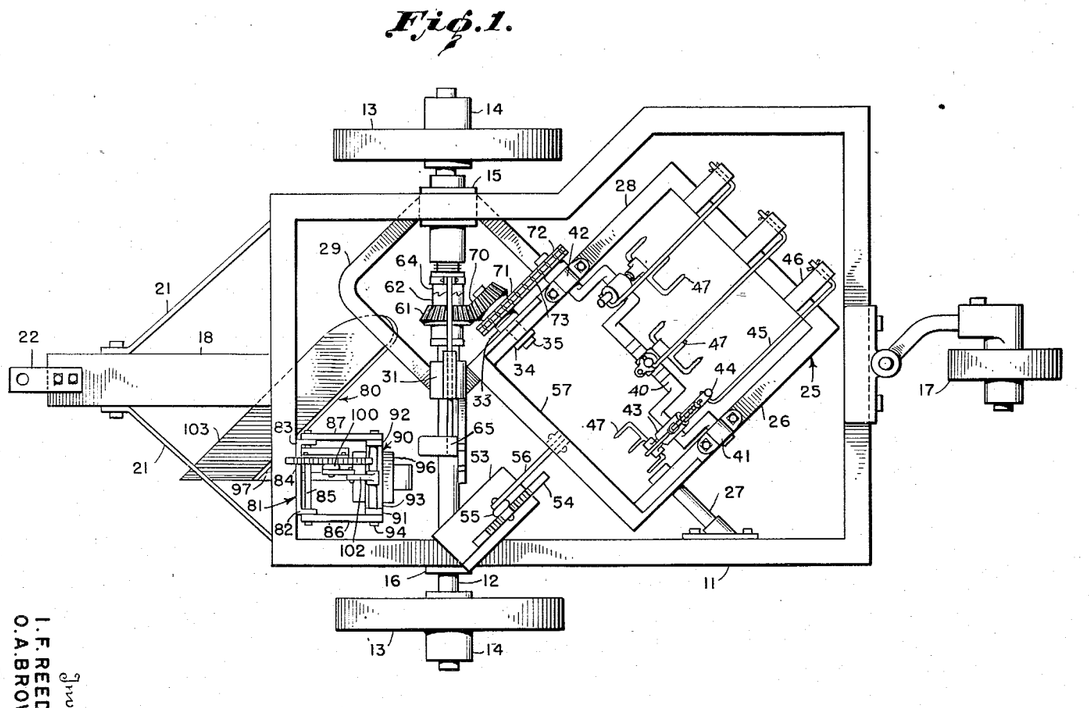
Figure 1 is a top plan view of one embodiment of the invention illustrating a machine having a rake and a digger blade mounted forward thereof (certain conventional parts being omitted for clarity of illustration)

Rake rod 44 is provided at its lower end with a set of downwardly extending rake teeth 47 having three individual teeth. The set is pivotally attached to said rake rod through a rake sleeve 48. A spring rod 49, which is attached at its lower end through an opening in rake sleeve 48 to the rake teeth through the medium of a link 50, lies parallel to rake rod 44 and is slidingly connected to a rake plate 51 which, in turn, is rigidly connected to rake-rod bearing 43. A compression spring 52 surrounds spring rod 49 and is biased between the top of the spring rod and the rake plate 51. This spring provides resiliency, so that the rake teeth can pivot in sleeve 48 against the compression of the spring, thus permitting them to pivot out of their normal position and returning them to such position to prevent the teeth from being broken upon contacting hard materials such as rocks, stones, and so forth. Although only one set of rake teeth and associated parts have been described, it is to be understood that a plurality is provided, one for each offset crank of crank shaft 40. Three sets, for example, are shown in Figure 1.

The rake, by virtue of its angular attachment to the main frame facing the forward direction of movement, rakes up the peanut vines, shakes them free of dirt, and casts them to one side.

A conventional means for selectively pivoting rake frame 25 on pivot pins 27 and 35 to raise and lower the rake teeth relative to the soil has a plate 53 rigidly fixed to the main frame. A rack 54 is rigidly mounted on the plate 53, and a lever 55 is pivotally mounted on the rack in a conventional manner. A link 56, pivotally attached at one of its ends to lever 55, also is pivotally attached at its other end to an upward extension 57 of the frontward side of the rake frame. In operation, lever 55 is moved counterclockwise, as viewed in Figure 2, causing the rearward side of rake frame 25 to rise. The lever is simply moved in a clockwise direction to lower the rake teeth.

Figure 3:
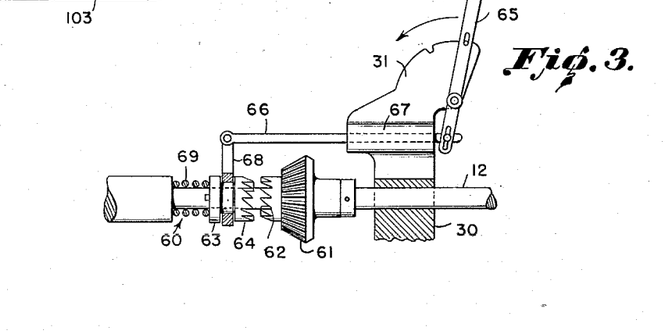
Figure 3 is a detail view of a clutch mechanism for optionally drivingly connecting the drive axle of the machine to the rake.

A means for optionally drivingly connecting axle 12 with the rake is provided in the form of a clutch 60, best shown in Figure 3. The clutch has a bevelled drive gear 61 which has teeth 62 integrally attached thereto, said gear being rotatably mounted on axle 12 but being prevented from sliding thereon by means of a conventional collar fixed to the axle. A ratchet 63, having teeth 64 to mate with teeth 62, is slidingly but non-rotatably mounted on the axle. The clutch also has a clutchplate 31 mounted on axle 12, the lower part of said clutchplate extending below the axle and being rigidly attached to bracket 29 as previously described. In order to place the clutch into engagement, a clutchlever 65, pivotally mounted on clutchplate 31, is moved in a counterclockwise direction, as viewed in Figure 3, along said clutchplate, causing a clutchbar 66, which is pivotally attached at one end to the clutchlever, to slide through a clutchsleeve 67 which is integral with the clutchplate. A yoke 68, which rotatably engages in an annular groove provided in ratchet 63 and which is rigidly attached to the other end of clutchbar 66, is therefore made to move along axle 12, causing teeth 62 to mate with teeth 64. A compressed clutchspring 69, which has been released by this movement, acts to keep the teeth in their engaged position. The clutch is disengaged by moving clutchlever 65 in a clockwise direction. Thus is provided a means for rotating the drive gear upon rotation of the axle.

A bevel driven gear 70, having an axis of rotation parallel to the axis of rotation of the crank shaft, and a sprocket 71 fixed relative to the driven gear, preferably integral therewith, are rotatably mounted relative to the rake frame on an extension of pivot pin 35, driven gear 70 engaging drive gear 61. Another sprocket 72 is fixedly mounted on an extension of crank shaft 40 in alignment with sprocket 71, and a link chain 73 is mounted on both sprockets 71 and 72. Thus is provided a means for rotating the crank shaft as the machine is drawn through a peanut field.

As mentioned before, gear 61, mounted on axle 12, is in constant engagement with gear 70, the latter gear and the sprocket 71 being mounted on pivot pin 35 which is aligned with pivot pin 27. This construction provides for pivoting rake frame 25 and for rotation of driven gear 70 on coincident axes whereby link chain 73 maintains a constant tension, and driven gear 70 is maintained in its constant engagement with drive gear 61 for all positions of the rake frame.

A digger 80, which is the means for loosening the soil around the peanut vines prior to the raking and shaking action of the rake, is provided forward of the rake and is mounted on the main frame 11. It is supported by a mechanism for raising and lowering it, as desired. This mechanism has a U-shaped member 81 which has a flange 82, a flange 83, and an intermediate plate 84 joining the flanges. The U-shaped member is rigidly attached to the inside surface of the forward end of the main frame through plate 84 and has its flanges protruding toward the rear of the main frame. A pivot pin 85, passing through the upper ends of flanges 82 and 83, pivotally attaches, at one of its ends, the forward end of an upper left-side link 86, while at its other end the pivot pin pivotally attaches the forward end of an upper right-side link 87 to the flanges. Another pivot pin 88, passing through the lower ends of said flanges, pivotally attaches, at one of its ends, the forward end of a lower left-side link 89, while at its other end this pivot pin pivotally attaches a lower right-side link (not shown in drawing), similar to link 87, to the flanges. Another U-shaped member 90, having arms 91 and 92 aligned with flanges 82 and 83, respectively, and an intermediate plate 93, joining the arms, is positioned so that its plate 93 lies horizontal, while arms 91 and 92 protrude upwardly. A pivot pin 94, passing through the upper ends of the arms 91 and 92, pivotally attaches the rearward ends of links 86 and 87 to the arms of the U-shaped member 90. Similarly, a pivot pin 95, passing through the lower ends of arms 91 and 92, pivotally attaches the rearward ends of link 89 and the corresponding lower right-side link to the arms. The left and right elevations of the linkage mechanism are parallelograms for reasons to be later given.

To the undersurface of plate 93 there is rigidly attached another plate 96 to which the beam 97 of the digger 80 is rigidly fixed.

A rack 98, having a plate 99 on which a lever 100 is pivoted, is rigidly fixed to plate 84. A link 101, which is firmly attached at one of its ends to lever 100, is pivotally attached at its other end to one end of a link 102, while link 102, at its other end, is pivotally attached to that portion of pivot pin 94 lying between links 86 and 87.

Figure 2:
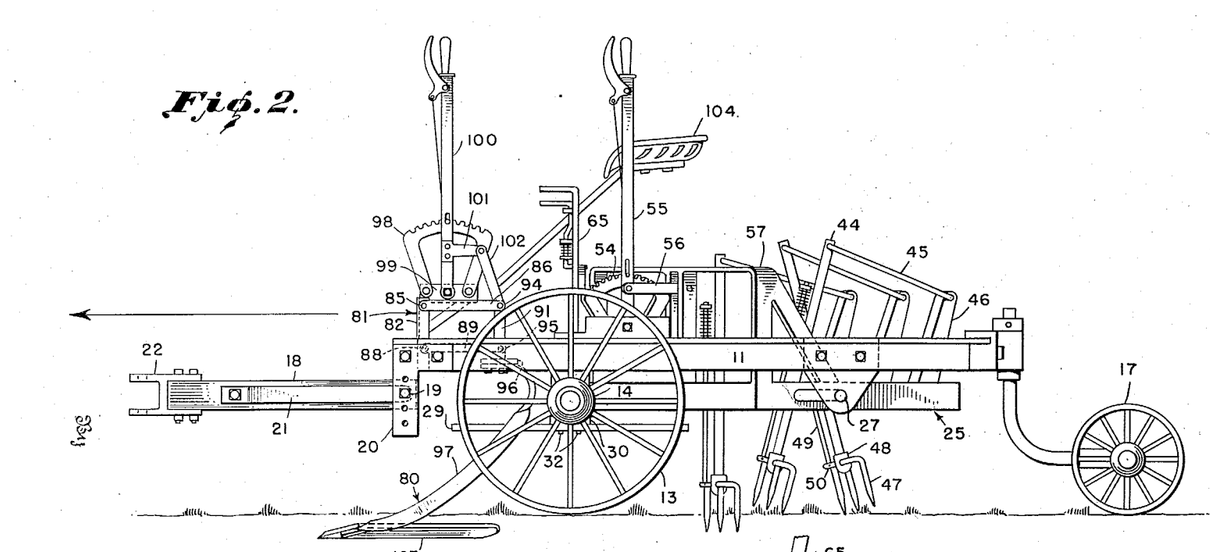
Figure 2 is a left side elevation thereof.

In operation, lever 100 is moved counterclockwise, as viewed in Figure 2, causing link 101, coacting with link 102, to raise the U-shaped member 90. Due to the fact that the right and the left elevations of the linkage mechanism are parallelograms and that digger 80 is rigidly attached to plate 96, the digger moves up, while at the same time, its blade 103 is maintained in a plane parallel to the ground at all times. Plates 93 and 96 are both narrower than the distance between the inside surfaces of link 89 and the corresponding lower right-side link, and consequently, when raised sufficiently high, the upper part of the beam 97 may pass between these links.

A conventional driver's seat 104 is also provided, being mounted on main frame 11 and extending sufficiently high to permit the driver a clear view in all directions.

In the operation of this embodiment, a drawing power, such as a team of animals or a tractor, is connected to hitch 22; lever 55 is moved to place the rake in a desired operative position; diggerblade 103 is adjusted to a desired depth in the soil; and the clutch 60 is engaged. As the machine is then drawn through a peanut field, the diggerblade loosens the soil around the peanut vines. The action of the rotating drivewheels and the driving attachments intermediate therewith and the crank shaft, causes the crank shaft to revolve and thus rotate the rake teeth in the desired manner.

Referring with more particularity to the embodiment shown in Figures 6 through 11, a main frame 110 is provided which has at its forward end a left arm 111 and a right arm 112, said arms being rigidly attached to each other by a brace 113 near their forward ends. At the forward ends of arms 111 and 112, there are respectively provided hitches 114 and 115, which are the means whereby a tractor may be attached to the main frame 110 to support it at its forward end. The main frame also has a rectangular hollow tube 116, the forward end of which is rigidly attached to the rearward ends of arms 111 and 112. A circular bar 117, having its forward end rigidly deposed within the rearward portion of hollow tube 116, has its rearward end extending therefrom to form the rear of the main frame.

A wheel-carriage assembly 118, which is pivotally mounted on the exposed part of circular bar 117, supports the rearward end of the main frame. The rearward end of the assembly has a horizontal carriage bar 119 which is rigidly attached at its left end to a downwardly extending bracket 120, braced with respect to the bar by means of brace 121 shown in Figure 7. The carriage bar is the means for supporting at its left end a vertical swivel 122, the lower end of said swivel being curved to fit and pass through the hub of a caster wheel 123, and being attached thereto in a conventional manner. The remaining portion of the swivel, in protruding upwardly, passes through a sleeve 124 and extends beyond the upper end of said sleeve. The swivel is maintained in its vertical position by the bracket 120, which is securely attached to the upper and lower ends of sleeve 124.

The right side of the rearward end of the wheel-carriage assembly 118 is similar in structure and function to the above-described left side, having a bracket 125, a brace 126, a swivel 127, a caster wheel 128, and a sleeve 129.

The wheel-carriage assembly 118, at its forward end, has a bearing 130 which lies approximately midway between and forward of the carriage bar 119. This bearing is supported in this position by braces 131 and 132, the forward ends of which are rigidly secured to the bearing, while their respective rearward ends are rigidly attached to brackets 120 and 125, respectively. In alignment with bearing 130 and rearwardly thereof, there is another bearing 133 which is rigidly attached to carriage bar 119.

In pivotally attaching the wheel-carriage assembly to the main frame, the rearward end of circular bar 117 is slid through bearing 130 and then through bearing 133. A collar 134 is placed on that part of circular bar 117 which protrudes rearwardly of bearing 133, and a cotter pin 135 is then slipped through collar 134 and that portion of the circular bar 117 which the collar surrounds. This mode of attachment permits the wheel-carriage assembly to pivot while preventing it, at the same time, from becoming detached.

The wheel-carriage assembly, by its construction, not only functions as a support for the main frame 110, but also permits the caster wheels to operate on rough ground while at the same time permitting depositing of the peanut vines, when raked, in a windrow between the caster wheels.

A left rake 140 and a right rake 141 are provided, both of these rakes being substantially similar in construction and function to the rake described in the first embodiment. That is, rake 140 has a rake frame and a crank shaft 142, the latter having a plurality of offset cranks on each of which is carried a set of rake teeth 143 and associated parts such as a rake-rod bearing 144, a rake rod 145, a rake bar 146, a rake sleeve 147, a spring rod 148, a link 149, a spring 150, and the other associated parts shown in the first embodiment. The reference characters mentioned above to designate the rake teeth and associated parts have been applied only to one set of rake teeth and associated parts, although a plurality is present, as shown in the drawing. The crank shaft 142 is mounted on the rake frame in a manner similar to the mounting of crank shaft 40 of the first embodiment; that is, the ends of the crank shaft are respectively mounted on left side 151 and right side 152 of the rake frame through shaft bearings 153 and 154, respectively.

Similarly, rake 141 has a rake frame and a crank shaft 155, the latter also having a plurality of offset cranks on each of which is carried a set of rake teeth 156 and associated parts such as a rake-rod bearing 157, a rake rod 158, a rake bar 159, a rake sleeve 160, a spring rod 161, a link 162, a spring 163, and the other associated parts shown in the first embodiment. The crank shaft is mounted on the rake frame in a manner similar to the mounting of crank shaft 40 of the first embodiment; that is, the ends of the crank shaft are respectively mounted on left side 164 and right side 165 of the rake frame through shaft bearings 166 and 167, respectively.

Rake 140, furthermore, has an upward extension 168 which is mounted on the forward ends of sides 151 and 152 of its rake frame, while rake 141 has a similar upward extension 169 mounted on the forward ends of sides 164 and 165 of its rake frame. A horizontal rake-bar support 170 is rigidly mounted on upward extension 168, and a similar horizontal rake-bar support 171 is rigidly mounted on upward extension 169. These rake-bar supports have their counterpart in rake-bar support 46 of the first embodiment, and, while they are mounted differently from support 46, they perform the same function.

One variation between the rakes of this embodiment and the rake of the first embodiment is the presence in the former of only two individual teeth on each set of rake teeth.

A further variation between the rakes of this second embodiment and the rake of the first embodiment is the presence in the former of a series of similar rigid bands 172. Each band is mounted on the respective rake frame of the rake of which it forms a part and hangs between, or adjacent to the rake rods. These bands, while not shown in the first embodiment, can readily be made a part thereof, and have the function of aiding in the removal of the peanut vines clinging to the rake teeth as the teeth move upwardly adjacent to the bands.

Rakes 140 and 141 are both pivotally mounted on the main frame 110, but in a somewhat different manner. Each mounting, therefore, will be described separately, with rake 140 being considered first.

The rake frame of rake 140 is mounted on a horizontal shaft 175, to be more fully described later, which passes through a lateral opening in the forward end of side 151, through a gear box 176, also to be more fully described later, and finally through a similar aligned lateral opening in the forward end of side 152. A bearing housing 177, through which the left end of the shaft passes, is rigidly attached by means of a bracket 178 to arm 111 of the main frame. The left end of this bearing housing extends through the opening at the forward end of side 151 and is mounted within a rotatable collar 179 which is rigidly attached to the rake frame. Another bearing housing 180, the left end portion of which extends into and is rigidly fixed to the gear box, and within which the right end of the shaft 175 is disposed, extends at its right end through the opening at the forward end of side 152 and is mounted within a rotatable collar 181 rigidly attached to the rake frame. This housing 180 is rigidly fixed, by means of a bracket 182, to the top surface of rectangular tube 116 of the main frame. These bearing housings 177 and 180 are the means, therefore, whereby the rake frame of rake 140 is pivotally attached to the main frame.

The rake frame of rake 141 is mounted on a similar horizontal shaft 183, to be later more fully described, each end of which passes through aligned lateral openings in the forward ends of sides 164 and 165. A bearing housing 184, through which the right end of the shaft 183 passes, is rigidly attached by means of a bracket 185 to arm 112 of the main frame. A generally similar bearing housing 186, mounted on and near the left end of shaft 183, also is rigidly attached, by means of a bracket 187, to arm 112. The right end of housing 184 and the left end of housing 186 are deposed within rotatable collars similar to collars 179 and 181 of rake 140. These bearing housings 184 and 186 are the means for pivotally attaching the rake frame of rake 141 to the main frame.

A means (best shown in Figures 10 and 11) for selectively pivoting the rake frame of rake 140 to raise and lower the rake teeth relative to the soil has a plate 190 on which a rack 191 is integrally mounted. This rack is attached to the main frame by means of an extension 192 of plate 190, which in turn, is rigidly fastened to a bracket 193 attached to arm 111 of the main frame. A bracing bar 194, attached at one of its ends to bracket 193 and at its other end to the undersurface of plate 190, furnishes additional support for the rack. The rack, which is located near the gear box, is further fixed in its position by rigid attachment to the gear box by conventional means, such as a bracket 195. A lever 196 is pivotally mounted on the rack in a conventional manner, and a link 197, pivotally attached at one of its ends to lever 196, also is pivotally attached at its other end to the upper horizontal portion of upward extension 168. In operation, lever 196 is moved counterclockwise, as best viewed in Figure 11, causing the rearward side of the rake frame to rise. The lever is simply moved in the opposite direction to lower the rake teeth.

Figure 9:
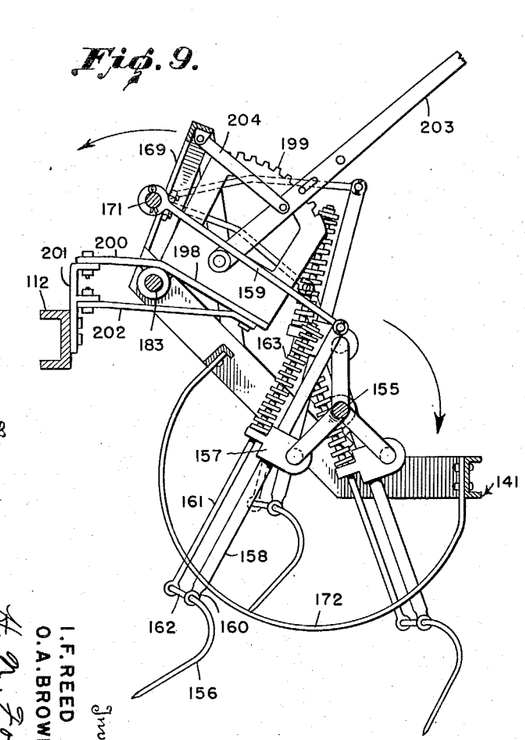
Figure 9 is a view taken on the line 9—9 of Figure 8.
Figures 10, 11:
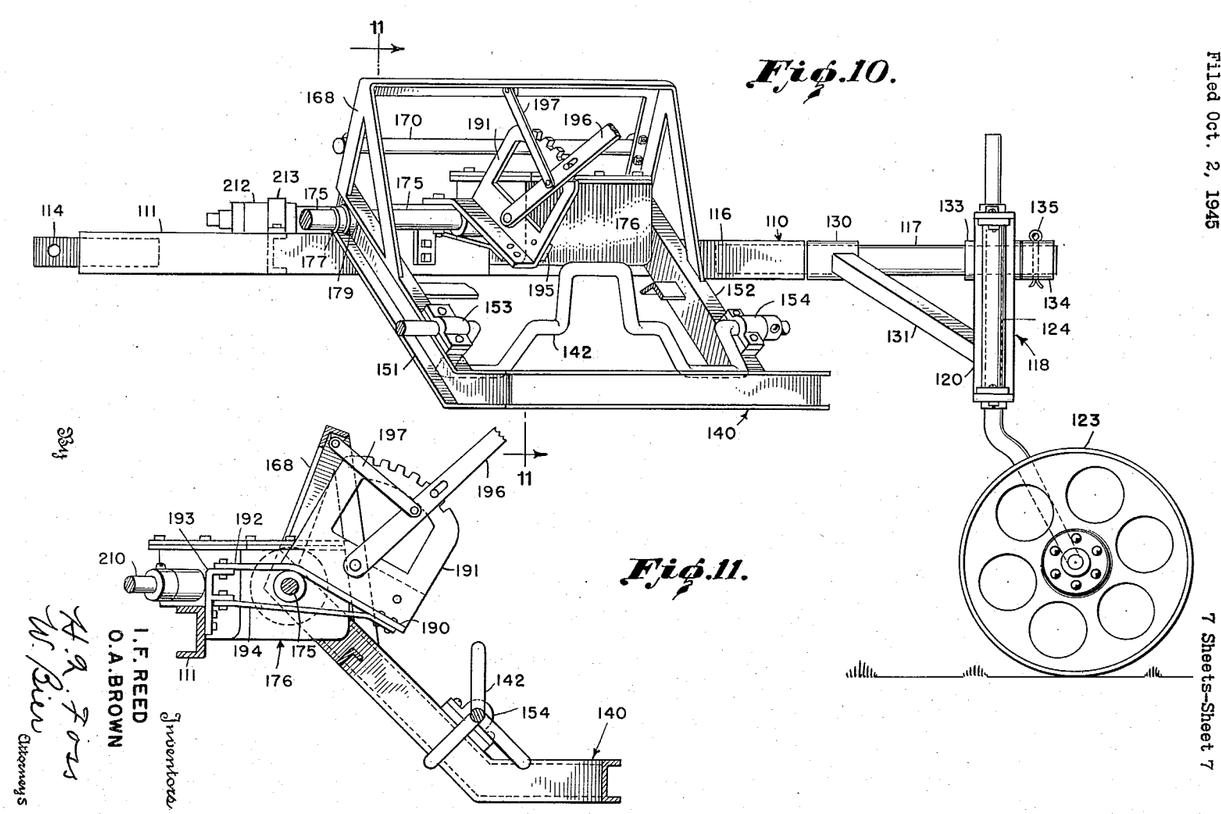
Figure 10 is a left-side elevation of the second embodiment with parts omitted to emphasize the manner of mounting the rake located on the left side of the machine.
Figure 11 is a view taken on a line 11—11 of Figure 10.

A means similar to the above for selectively pivoting the rake frame of rake 141 is best shown in Figure 9. It has a plate 198, a rack 199, an extension 200 of plate 198, a bracket 201 (the counterpart of bracket 193), a bracing bar 202, a lever 203, and a link 204, the link in this instance being pivotally attached at one of its ends to lever 203 and at its other end to the upper horizontal portion of upward extension 169. In construction and function, this mechanism is similar to its counterpart of rake 140.

A means for causing the simultaneous operation of rakes 140 and 141 is provided in the form of a rotatable drive shaft 210, the forward end of which has means for attachment to a conventional power take-off of a tractor, while the rearward end, which extends into the gear box, has a drive gear 211 fixed thereon to rotate with the drive shaft. A bearing housing 212, through which the forward end of the drive shaft passes, is rigidly attached to brace 113 by means of a clamp 213 fitted over the bearing housing. Another bearing housing 214, through which the rearward end of the drive shaft passes, is rigidly attached at its rearward end to the forward side of the gear box, thus aiding in maintaining the position of the drive shaft.

As the drive shaft rotates, a driven gear 215, having its axis of rotation parallel to the axis of rotation of crank shaft 142, which is in constant engagement with drive gear 211 and which is rigidly fixed on shaft 175, is caused to rotate, thereby causing shaft 175 to do likewise. As this shaft rotates, a link chain 216, which is mounted on both a sprocket 217 fixed on the left end of the shaft and thereby fixed relative to driven gear 215, and on an aligned sprocket 218 fixed on an extension of crank shaft 142, turns, thus causing the crank shaft 142 to rotate. Thereafter, the rake teeth and associated parts of this rake 140 operate as in the rake of the first embodiment. A bearing housing 219, mounted on shaft 175, has its right end extending into the gear box and is rigidly fixed to the gear box to furnish support in maintaining the position of shaft 175.

Simultaneously with the rotation of shaft 175, a drive gear 220, also rigidly fixed on shaft 175, is thereby caused to rotate, with the result that another driven gear 221, having its axis of rotation parallel to the axis of rotation of crank shaft 155, with which it is in constant engagement, also revolves. Gear 221, being rigidly mounted on shaft 183, causes that shaft to rotate, with the result that a link chain 222, mounted on a sprocket 223 fixed, relative to driven gear 221, on the right end of shaft 183 and on a sprocket 224 fixed on an extension of crank shaft 155, turns, causing the crank shaft to rotate. Thereafter, the rake teeth and associated parts of this rake 141 operate as in the rake of the first embodiment. A bearing housing 225, through which the left end of shaft 183 passes, is rigidly attached to the gear box, its left end extending therein, to furnish additional support of shaft 183.

It should be observed that the unique construction of this embodiment provides for the pivoting of the rake frame of rake 140 and for rotation of the gears 215 and 220 on coincident axes corresponding to the axis of rotation of shaft 175, with the result that link chain 216 maintains a constant tension and gear 215 is maintained in its constant engagement with gear 211 for all positions of the rake frame.

In a similar manner, the construction provides for pivoting the rake frame of rake 141 and for rotation of gear 221 on coincident axes corresponding to the axis of rotation of shaft 183, whereby link chain 222 maintains a constant tension and gear 221 is maintained in its constant engagement with gear 220 for all positions of the rake frame.

In the operation of this embodiment, the soil is first loosened around the peanut vines by means of an independent machine such as a digger similar to that shown in the first embodiment. A tractor is connected to hitches 114 and 115, the drive shaft 210 is connected to the power take-off of the tractor, and levers 196 and 203 are moved to place the rakes 140 and 141 in a desired operative position. By virtue of the fact that rake 140 is angularly disposed on the main frame facing the direction of movement of the machine, and since rake 141 is also angularly disposed in a similar manner on the opposite side of the main frame, the rakes, as the machine is drawn through the fields, rake up two rows of peanut vines and deposit them in a windrow between the caster wheels.

Having thus described our invention, we claim:

1. A peanut-digging machine comprising a main frame, a rake frame pivotally mounted on the main frame, a drive gear, a driven gear rotatably mounted relative to said rake frame and in constant engagement with the drive gear, a sprocket fixed relative to said driven gear, a crank shaft rotatably mounted on the rake frame with its axis of rotation parallel to the axis of rotation of the driven gear, downwardly extending rake teeth carried by the crank shaft and movable in a plane having a vertical component, a sprocket fixedly mounted on the crank shaft and in alignment with the aforementioned sprocket, a link chain mounted on both the aforementioned sprockets, means for rotating the drive gear thereby to rotate the crank shaft, said rake frame, crank shaft, and rake teeth being angularly disposed to and across the path of travel of the machine, and means for selectively pivoting the rake frame to raise and lower the rake teeth relative to the soil whereby they can grasp the peanut vines, the axis of pivoting of the rake frame being coincident with the axis of rotation of the driven gear, with the result that the link chain maintains a constant tension and the drive gear and driven gear remain in constant engagement for all positions of the rake frame.

2. A peanut-digging machine comprising a main frame, a rake frame pivotally mounted on the main frame, a drive gear, a driven gear rotatably mounted relative to said rake frame and in engagement with the drive gear, a sprocket fixed relative to said driven gear, a crank shaft rotatably mounted on the rake frame with its axis of rotation parallel to the axis of rotation of the driven gear, a rake rod rotatably mounted between its ends on a crank of the crank shaft, means for constraining the upper end of the rake rod to oscillate about a fixed center, downwardly extending rake teeth pivotally attached to the lower end of the rake rod, a sprocket fixedly mounted on the crank shaft and in alignment with the aforementioned sprocket, a link chain mounted on both the aforementioned sprockets, means for rotating the drive gear thereby to rotate the crank shaft, said rake frame, crank shaft, rake rod, and rake teeth being angularly disposed to and across the path of travel of the machine, and means for selectively pivoting the rake frame to raise and lower the rake teeth relative to the soil whereby they can grasp the peanut vines, the axis of pivoting of the rake frame being coincident with the axis of rotation of the driven gear, with the result that the link chain maintains a constant tension and the drive gear and driven gear remain in constant engagement for all positions of the rake frame.

3. A peanut-digging machine comprising a main frame, a rake frame pivotally mounted on the main frame, a drive gear, a driven gear rotatably mounted relative to said rake frame and in engagement with the drive gear, a sprocket fixed relative to said driven gear, a crank shaft rotatably mounted on the rake frame with its axis of rotation parallel to the axis of rotation of the driven gear, a rake rod rotatably mounted between its ends on a crank of the crank shaft, a rake bar pivotally mounted at one of its ends to the upper end of the rake rod and at its other end pivotally attached to the rake frame, downwardly extending rake teeth pivotally attached to the lower end of the rake rod, a sprocket fixedly mounted on the crank shaft and in alignment with the aforementioned sprocket, a link chain mounted on both the aforementioned sprockets, means for rotating the drive gear thereby to rotate the crank shaft, said rake frame, crank shaft, rake rod, rake bar, and rake teeth being angularly disposed to and across the path of travel of the machine, and means for selectively pivoting the rake frame to raise and lower the rake teeth relative to the soil whereby they can grasp the peanut vines, the axis of pivoting of the rake frame being coincident with the axis of rotation of the driven gear with the result that the link chain maintains a constant tension and the drive gear and driven gear remain in constant engagement for all positions of the rake frame.

IRVIN F. REED.
ORAL A. BROWN.

REFERENCES CITED

The following references are of record in the file of this patent:

UNITED STATES PATENTS

| Number | Name | Date |
|---|---|---|
| 589,796 | Sharp | Sept. 7, 1897 |
| 1,302,568 | Lee | May 6, 1919 |
| 1,448,319 | Thetford | Mar. 13, 1923 |
| 1,558,070 | Wirsching | Oct. 20, 1925 |
| 1,759,741 | Fowler | May 20, 1930 |

FOREIGN PATENTS

| Number | Country | Date |
|---|---|---|
| 239,468 | Germany | Oct. 12, 1911 |
| 570,524 | France | Jan. 17, 1924 |
| 162,385 | Switzerland | Sept. 16, 1933 |

OTHER REFERENCES

Reed, "Developments in Peanut Harvesting Equipment," published April 1944 in Agricultural Engineering, vol. 25, No. 4, pp. 125, 126, 128. (Copy in Library.)